United States Patent
Bekritsky et al.

(10) Patent No.: US 12,095,169 B2
(45) Date of Patent: Sep. 17, 2024

(54) SYSTEMS AND METHODS FOR ENHANCED FAULT TOLERANCE FOR RFID PHASED ARRAY ANTENNAS

(71) Applicant: ZEBRA TECHNOLOGIES CORPORATION, Lincolnshire, IL (US)

(72) Inventors: Benjamin J. Bekritsky, Modiin (IL); Michael J. Koch, Saint James, NY (US); Alexander M. Jacques, Kings Park, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 616 days.

(21) Appl. No.: 17/218,302

(22) Filed: Mar. 31, 2021

(65) Prior Publication Data

US 2022/0320710 A1 Oct. 6, 2022

(51) Int. Cl.
*H01Q 3/26* (2006.01)
*G06K 7/10* (2006.01)
*H04B 7/06* (2006.01)
*H04B 17/12* (2015.01)
*H04B 17/17* (2015.01)

(52) U.S. Cl.
CPC ......... *H01Q 3/267* (2013.01); *G06K 7/10346* (2013.01); *G06K 7/10475* (2013.01); *H04B 7/0617* (2013.01); *H04B 17/12* (2015.01); *H04B 17/17* (2015.01)

(58) Field of Classification Search
CPC ........ H01Q 3/267; H04B 17/17; H04B 17/12; H04B 7/0617; G06K 7/10346; G06K 7/10475

USPC ................................ 342/173, 368, 372, 374
See application file for complete search history.

(56) References Cited

U.S. PATENT DOCUMENTS

| | | | | |
|---|---|---|---|---|
| 5,416,489 A | * | 5/1995 | Mailloux | G01S 7/4008 342/173 |
| 5,530,449 A | * | 6/1996 | Wachs | H01Q 3/267 342/372 |
| 6,140,976 A | * | 10/2000 | Locke | H01Q 3/28 342/374 |
| 6,339,398 B1 | * | 1/2002 | Redvik | H01Q 3/267 342/368 |

(Continued)

FOREIGN PATENT DOCUMENTS

| | | | | |
|---|---|---|---|---|
| CN | 101281997 A | * | 10/2008 | |
| EP | 3182509 B1 | * | 12/2021 | ............. H01Q 1/246 |

*Primary Examiner* — Bo Fan (57) ABSTRACT

Systems and methods for enhanced fault tolerance for a radio frequency identification (RFID) phased array antenna are provided. The systems include a RFID reader that includes (i) a phased array antenna having N antenna elements; and (ii) a controller operatively connected to the phased array antenna. The controller is configured to (1) monitor a characteristic for each antenna element of a set of the N antenna elements; (2) based on the characteristic, detect a fault of a faulty antenna element of the set of the N antenna elements; and (3) responsive to detecting the fault of the faulty antenna element of the set of the N antenna elements, adjust a parameter of at least one other antenna element of the N antenna elements, wherein the parameter is a weight applied to a signal that is transmitted to or received at an antenna element.

20 Claims, 7 Drawing Sheets

(56) References Cited

U.S. PATENT DOCUMENTS

| | | | | |
|---|---|---|---|---|
| 8,907,845 B2* | 12/2014 | Jones | ............... | G01S 13/4463 |
| | | | | 342/368 |
| 9,882,279 B2* | 1/2018 | Bull | ............... | H04B 7/0617 |
| 10,819,448 B2* | 10/2020 | Raghavan | ............... | H04B 17/17 |
| 10,985,819 B1* | 4/2021 | Durbin | ............... | H04B 7/0617 |
| 11,343,681 B1* | 5/2022 | Kim | ............... | H04W 16/28 |
| 2002/0070894 A1* | 6/2002 | Vail | ............... | H01Q 1/38 |
| | | | | 342/368 |
| 2006/0019710 A1* | 1/2006 | Ylitalo | ............... | H01Q 3/267 |
| | | | | 455/562.1 |
| 2013/0183907 A1* | 7/2013 | Kim | ............... | H04W 24/02 |
| | | | | 455/562.1 |

* cited by examiner

SYSTEMS AND METHODS FOR ENHANCED FAULT TOLERANCE FOR RFID PHASED ARRAY ANTENNAS

BACKGROUND

A radio frequency identification (RFID) reader may include a phased array antenna that has multiple antenna elements. A controller of the phased array antennas is configured to control the input signals to the array of antenna elements to emit primary transmit beams (also referred to as interrogation beams) directed to various regions within an environment and primary receive beams via which interrogation responses from RFID tags located in the environment are received. To generate the primary beams, the controller configures the phase and amplitude of the transmit and receive signals to/from each antenna element such that radio frequency (RF) signals emitted or received by each of the antenna elements constructively interfere with one another to form the beam in an intended direction.

However, for various reasons, one or more of the antenna elements may experience a fault that prevents the controller from properly configuring the faulty antenna elements. Accordingly, when the remaining antenna elements emit their respective RF signals, the resultant beam is skewed from the intended direction. This reduces the ability to accurately track RFID tags within the environment. Accordingly, there is a need for systems and methods for enhanced fault tolerance for RFID phased array antennas.

SUMMARY

In an embodiment, the present invention is a radio frequency identification (RFID) reader. The RFID reader includes (i) a phased array antenna having N antenna elements; and (ii) a controller operatively connected to the phased array antenna. The controller is configured to (1) monitor a characteristic for each antenna element of a set of the N antenna elements; (2) based on the characteristic, detect a fault of a faulty antenna element of the set of the N antenna elements; and (3) responsive to detecting the fault of the faulty antenna element of the set of the N antenna elements, adjust a parameter of at least one other antenna element of the N antenna elements, wherein the parameter is a weight applied to a signal that is transmitted to or received at an antenna element.

In another embodiment, the present invention is a method for maintaining directionality of a radio frequency identification (RFID) signal in response to a fault detected at an array of antenna elements. The method includes (1) monitoring, by a controller, a characteristic for each antenna element of a set of the array of antenna elements; (2) based on the characteristic, detecting, by the controller, a fault of a faulty antenna element of the set of the array of antenna elements; and (3) responsive to detecting the fault of the faulty antenna element of the set of the N antenna elements, adjusting, by the controller, a parameter of at least one other antenna element of the array of antenna elements, wherein the parameter is a weight applied to a signal that is transmitted to or received at an antenna element.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 1:
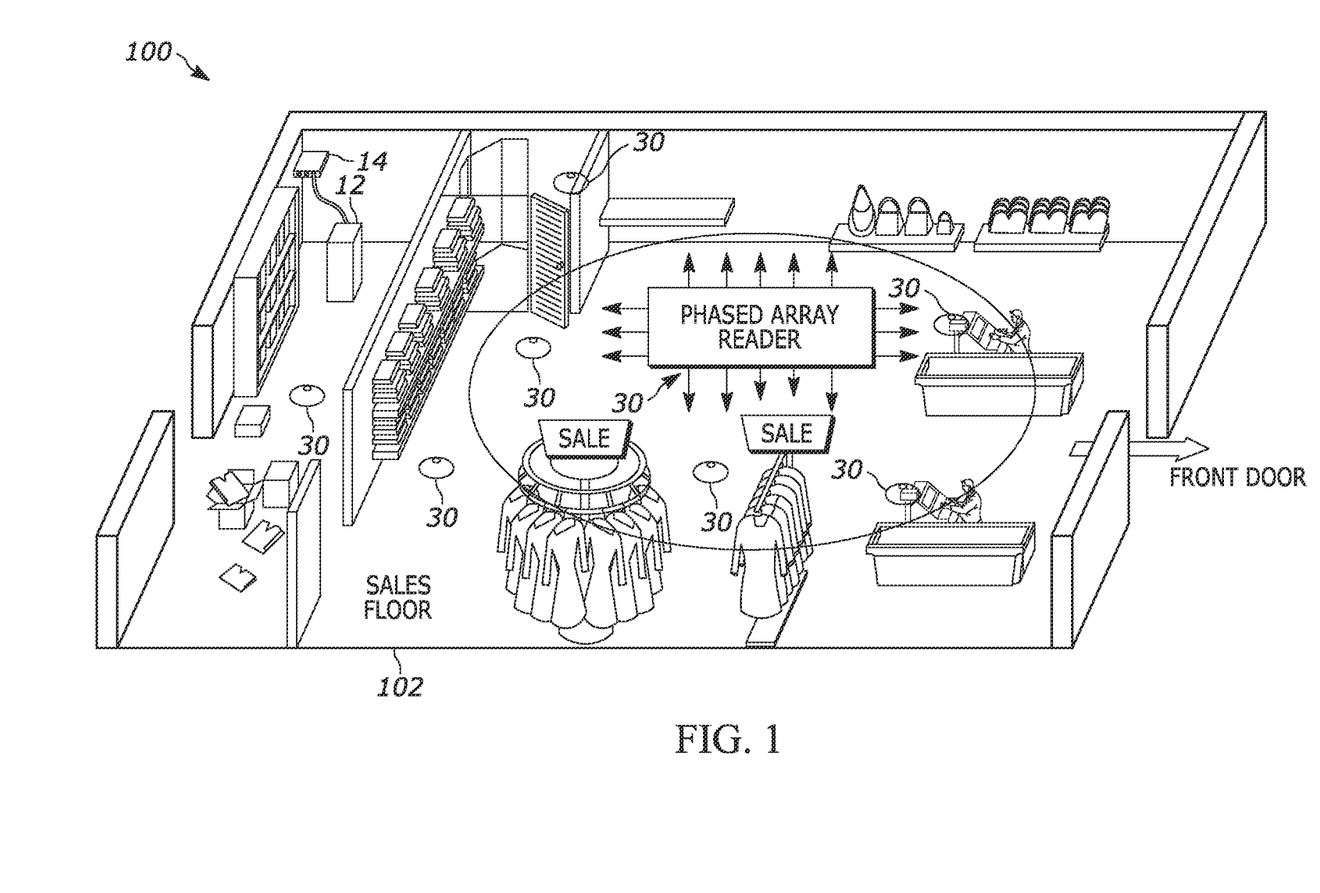
FIG. 1 illustrates an example venue that includes the RFID reader disclosed herein.

FIG. 1 is a perspective view, as seen from above, of a venue 100 illustrating an arrangement for which a Radio Frequency Identification (RFID) tracking system within the venue 100 is deployed to facilitate tracking RFID tags within the venue. Although the example venue 100 is a retail venue, other types of venues (such as a warehouse, an airport, a stadium, a performance center, a museum, and so on) are envisioned. In the example embodiment of FIG. 1, the venue 100 includes a backroom that has a centralized controller 12. In other embodiments, the centralized controller 12 may be located off-venue. The centralized controller 12 may be operated by store personnel and/or personnel associated with the RFID tracking system.

The centralized controller 12 may comprise a networked host computer or server. The centralized controller 12 may be connected to a plurality of RFID readers 30 positioned throughout the venue 100 via the network switch 14. As further described herein, the RFID readers 30 include a phased array antenna that includes two or more antenna elements. The RFID readers 30 are configured to detect RFID tags (not depicted) that are affixed to objects (such as clothing, books, toys, packages or any other object at a venue). In some embodiments, the RFID readers 30 are included in a detector station that may include other sensors in addition to the RFID readers 30, for example, image sensors, ultrasonic sensors, etc.

Each of the RFID readers 30 may either be in either wired or wireless electronic communication with centralized controller 12 via the network switch 14. For example, in some embodiments, the RFID readers 30 may be connected via Category 5 or 6 cables and use the Ethernet standard for wired communications. In other embodiments, the RFID readers 30 may be connected wirelessly, using built-in wireless transceiver, and may use the IEEE 802.11 (WiFi) and/or Bluetooth standards for wireless communications. Other embodiments may include RFID readers 30 that use a combination of wired and wireless communication. As the objects are picked up by individuals, the RFID readers 30 relay positioning information of the objects (and/or the RFID tags affixed thereto) to the centralized controller 12. Accordingly, the centralized controller 12 is able to track the position of the objects as they are carried throughout the venue.

Figure 2:
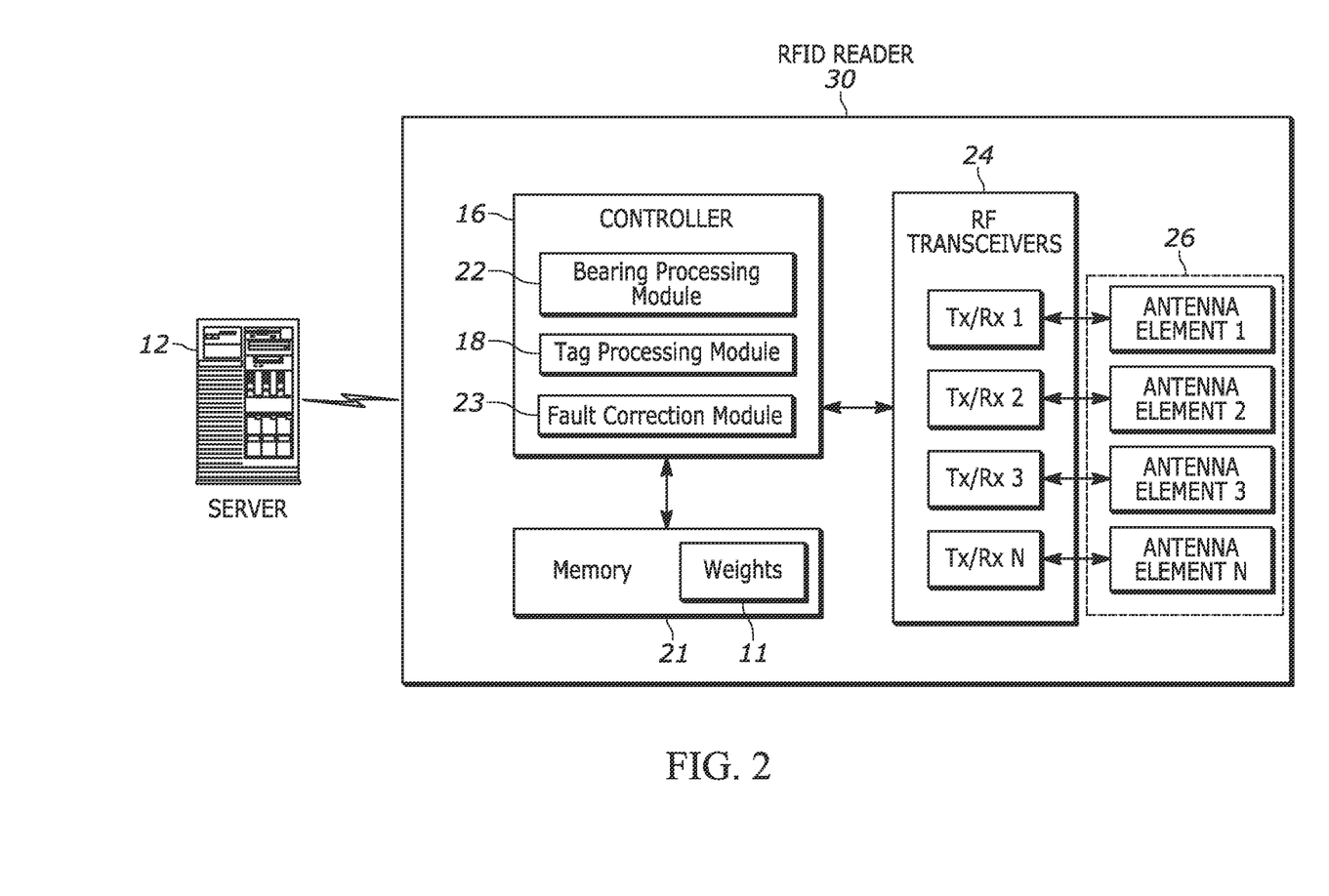
FIG. 2 illustrates an example block diagram of the RFID reader of FIG. 1.

FIG. 2 depicts an RFID tag reading system for determining positioning and/or bearings of RFID tags associated with objects to be tracked or monitored in a fault-tolerant manner. The system has an RFID reader 30, with a housing, connected to the server or host 12 (e.g., the centralized controller 12 of FIG. 1). The RFID reader 30 also has an array of antenna elements 26 that includes antenna elements 1, 2, 3 . . . , N, preferably in a phased array arrangement. The resulting phased array arrangement may include antenna elements that are electronic steered, mechanically steered, and/or steered via a fully printed shifter. In some embodiments, at least one of the antenna elements 26 is an omni-directional antenna element. In other embodiments, the entire array of antenna elements 26 is comprised of omni-directional antenna elements. The RFID reader 30 also has a plurality of RF transceivers 24 that includes Tx/Rx 1, Tx/Rx 2, Tx/Rx 3, . . . , Tx/Rx N. In the illustrated example, each of the transceivers 24 is connected to a respective antenna element of the antenna elements 26; however in other embodiments, the number of transceivers 24 may be different from the number of antenna elements 26. For example, a particular transceiver of the transceivers 24 may be connected to two or more antenna elements of the antenna elements 26.

Figure 3:
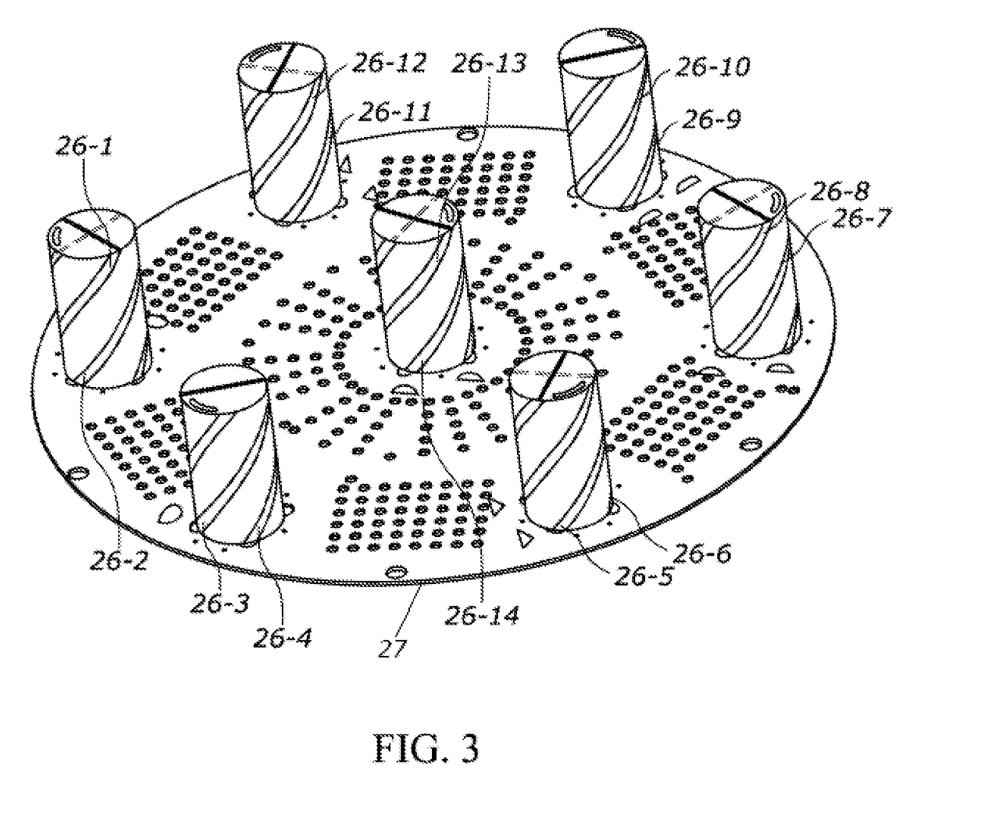
FIG. 3 illustrates an example phased antenna array included in the RFID reader of FIG. 1.

FIG. 3 illustrates an example antenna 27 that includes 14 antenna elements 26. As illustrated, the antenna 27 includes seven protrusions, each having two antenna traces (i.e. antenna elements) wrapped helically therearound. Accordingly, if the RFID reader 30 of FIG. 2 includes the antenna 27 of FIG. 3, the RFID reader 30 may also include 14 RFID transceivers 24. It should be appreciated that the antenna 27 is one example antenna, and the RFID reader 30 may include a different number of antenna elements 26 and/or transceivers 24 depends on the particular application.

In the illustrated embodiment, a controller 16 is operatively connected to the transceivers 24 to control their operation via one or more scan cycles or modes of operation, as described below. As it is used herein, any reference to the controller 16 "controlling" and/or "adjusting" a transceiver 24 and/or antenna element 26 includes the controller 16 controlling and/or adjusting a signal transmitted to or received by the transceiver 24 and/or antenna element 26. In one embodiment, the controller 16 is a processing platform capable of executing instructions to, for example, implement operations of the example methods described herein, as may be represented by the flowcharts of the drawings that accompany this description. Other example controllers capable of, for example, implementing operations of the example methods described herein include field programmable gate arrays (FPGAs) and application specific integrated circuits (ASICs). Accordingly, the controller 16 may include a processor such as, for example, one or more microprocessors, controllers, and/or any suitable type of processor.

The example RFID reader 30 of FIG. 2 also includes memory (e.g., volatile memory, non-volatile memory) 21 accessible by the controller 16 (e.g., via a memory controller). The controller 16 interacts with the memory 21 to obtain, for example, machine-readable instructions stored in the memory 21 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the RFID reader 30 to provide access to the machine-readable instructions stored thereon. As illustrated, the memory 21 may include a database of weight values 11 to apply to signals transmitted and/or received via the RF transceivers 24.

As illustrated, the controller 16 executes a tag processing module 18 to process data received from RFID tags in the venue 100, a bearing processing module 22 to determine a bearing and/or position of the RFID tags based upon the data processed by the tag processing module 18, and a fault correction module 23 to detect a fault associated with one of the antenna elements 26 and correct control of the antenna elements 26 in view thereof. The modules 18, 22, and 23 may be software-based, hardware-based, or a combination thereof. In some embodiments, portions of the software executed as part of the modules 18, 22, and 23 may be programmed into processors of the controller. Additionally or alternatively, the software executed by the modules 18, 22, and 23 may include instructions stored at the memory 21. Although the bearing processing module 22 is depicted in FIG. 2 as being implemented in the RFID reader 30, it will be understood that the bearing processing module 22, either in whole or in part, can also be implemented at the server 12.

Figure 4A:
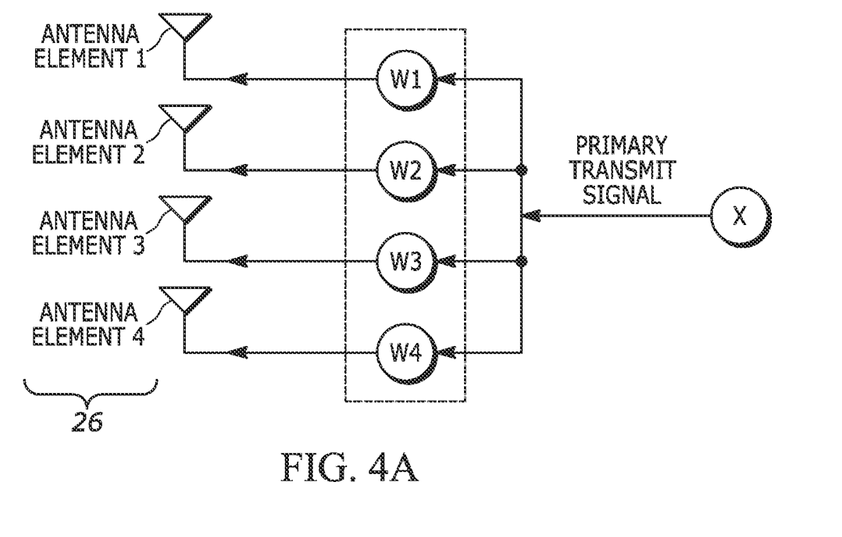
FIG. 4A is schematic diagram depicting the generation of a primary transmit beam by the RFID reader of FIG. 1 and based upon a set of weights.

During execution of an RFID tag scan, the controller 16 executes the tag processing module 18 by which the transceivers 24 are commanded to generate and steer a primary transmit beam over via the antenna elements 26 to interrogate RFID tags located in the venue 100. As shown in FIG. 4A, the primary transmit signal (X) is conducted along different channels between the controller 16 and the antenna elements 26. Typically, the primary transmit signal is a signal that interrogates at least a portion of the RFID tags within the venue 100. To steer the primary transmit beam, a set of weights {W1, W2, W3, W4} is obtained from the weights database 11 and introduced into respective channels between the controller 16 and the antenna elements 26. For example, the controller 16 may apply the weights to the primary transmit signal before routing to the respective transceivers 24 corresponding to the antenna elements 26. Each weighting factor may be a complex multiplier that adjusts the phase and/or the amplitude of the primary transmit signal emitted by the antenna elements 26. By settings the weights for each channel to particular predetermined values, the signals emitted by the antenna elements 26 constructively interfere with one another in a desired orientation to produce a coherent signal that forms the primary transmit beam. In addition to the orientation, the weights may also be set to control the polarization of the primary transmit beam (e.g., horizontal, vertical, right hand circular, left hand circular, etc.). Thus, the antenna elements 26 may be viewed as forming a phased array antenna. Baseband steering of the primary transmit beam by setting a complex coefficient for each channel is described in U.S. Pat. No. 8,587,495 and/or to "A Primer on Digital Beamforming", by Toby Haynes, in Spectrum Signal Processing, Mar. 26, 1998, the contents of said patent and said primer being incorporated herein by reference in their entirety.

Figure 4B:
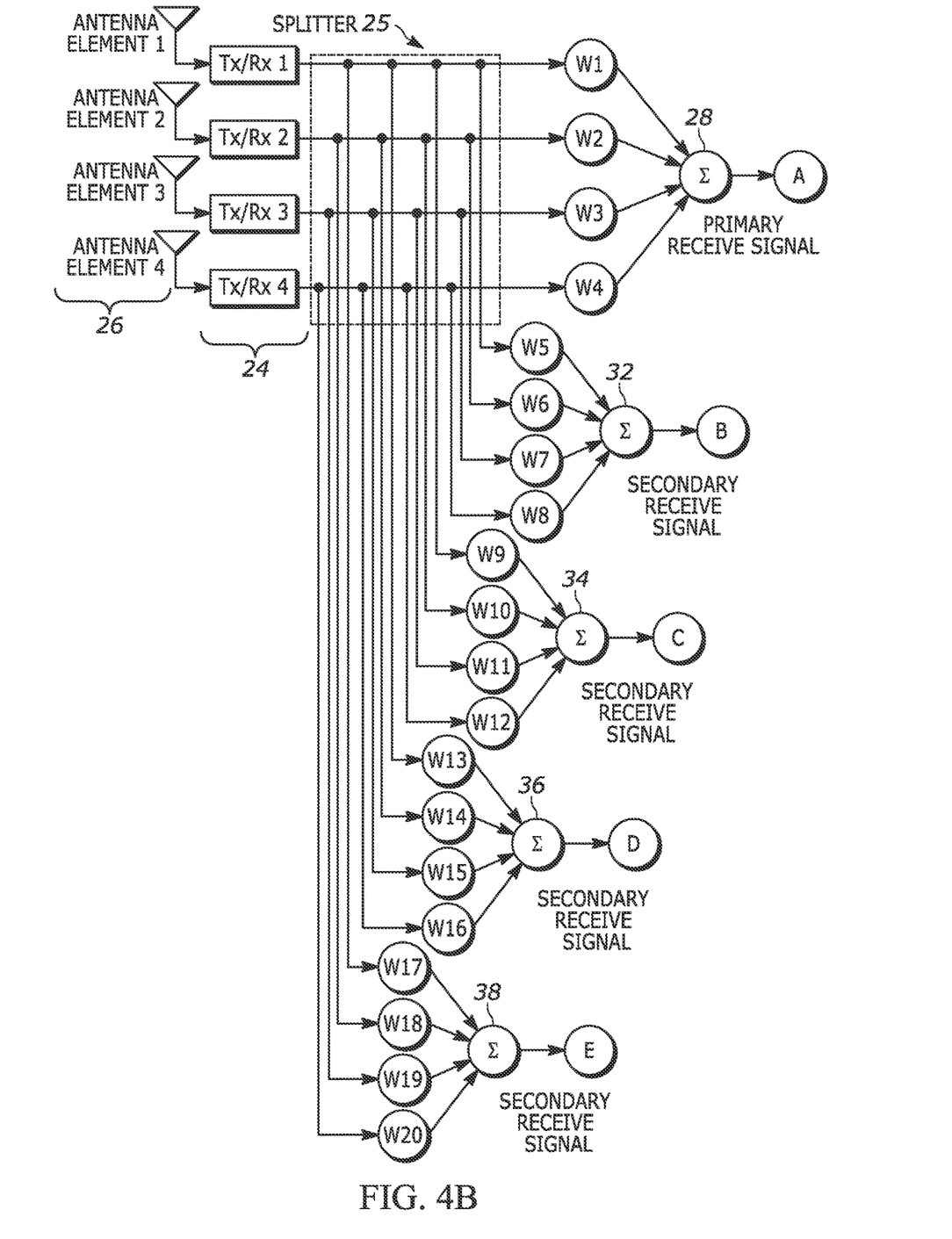
FIG. 4B is schematic diagram depicting the generation of receive signals by the RFID reader of FIG. 1 and based upon a set of weights.

After emitting the primary transmit beam that includes the interrogation signal, the controller 16 also executes the tag processing module 18 by which the transceivers 24 are commanded to generate and steer a primary receive beam at a primary steering angle by receiving a primary receive signal via the antenna elements 26 from each RFID tag responding to the interrogation signal of the primary transmit beam. In other words, the transceivers 24 are commanded to receive a primary receive signal from along a predetermined direction (steering angle). As used in the present disclosure, references to receiving a signal(s) from or along a specific direction or angle (e.g., azimuth and elevation angle relative to the phased antenna array) should be understood to encompass sampling and/or determining a signal(s) from or along a specific direction or angle. Likewise, references to receiving a signal(s) from, along, or over a specific range (angular or otherwise) should be understood to encompass sampling and/or determining a signal(s) from, along, or over a specific range (angular or otherwise). As shown in FIG. 4B, the antenna elements 26 receive return signals from each interrogated tag along different channels (in this example, four), and then a set of weights {W1, W2, W3, W4} is obtained from the weights database 11 and introduced into respective channels before all the weighted return signals are summed in an adder 28 in order to generate the primary receive signal (A). The sampling angle/direction of the primary receive signal is affected by the weights W1, W2, W3 and W4. As it is used herein, the term "bearing" should be understood synonymously with a direction relative to the RFID reader 30 defined by an elevation angle and an azimuth angle.

Figure 5:
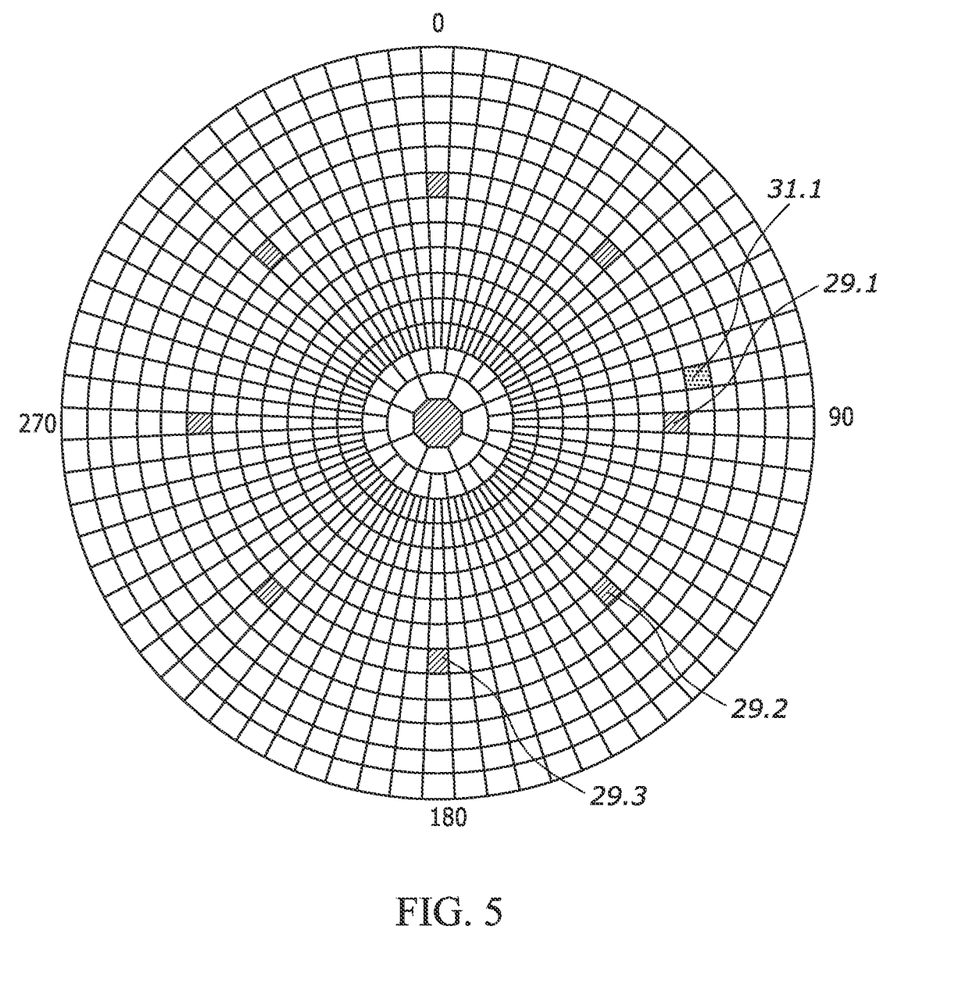
FIG. 5 is an example polar diagram depicting an aim pattern of primary transmit signals transmitted by the RFID reader of FIG. 1.

FIG. 5 illustrates a polar diagram showing an example aim pattern of primary beams transmitted by the example RFID reader 30 of FIG. 2. Generally, it is assumed that the RFID reader 30 is mounted in an overhead fashion to a ceiling or similar surface of the venue 100. The diagram extends over a 360° azimuth range and over a 70° elevation range with 0° elevation reference direction being at the center of the diagram, the 70° elevation direction being at the outer-most periphery of the diagram, and each concentric circle representing a change of 5° in elevation relative to any adjacent circle. In the illustrated example, the RFID reader 30 is configured to sequentially emit nine primary beams based on corresponding primary transmit signals with each of the beams having its main lobe directed in a predefined azimuth and elevation direction 29.1, 29.2, . . . 29.n. For example, the primary transmit beam directed at 29.1 is transmitted in direction having an approximate bearing of 90 degrees azimuth and 45 degrees elevation. Of course, the RFID reader 30 may be configured to emit any number of beams depending upon the particular scan cycle programmed into the tag processing module 18.

As described herein, when the RFID reader 30 includes a faulty antenna element 26, when the RFID reader 30 attempts to generate a beam directed at a particular azimuth/elevation angle, the absence of the signal transmitted by the faulty antenna element causes the generated beam to instead be directed at a different azimuth/elevation angle. For example, if the RFID reader 30 was instructed to generate a beam directed at azimuth/elevation angle 29.1, the RFID reader 30 may instead generate a beam directed at azimuth/elevation angle 31.1. Accordingly, by implementing the disclosed fault tolerance techniques, the RFID reader 30 is able to still generate a beam directed at azimuth/angle 29.1 even if the RFID reader 30 includes a faulty antenna element.

As it is used herein, the term "faulty antenna element" is not limited to faults that occur in the antenna element itself. To this end, the term "faulty antenna element" encompasses (i) faults that occurs in the channel between the faulty antenna element and its corresponding RF transceiver 24, (ii) faults that occur in the RF transceiver 24 corresponding to the faulty element, (iii) faults that occur in the channel between the controller 16 and the RF transceiver 24 corresponding to the faulty element, and (iv) faults in another component of the RFID reader 30 that affects the signals transmitted by and/or received at the faulty antenna element. Said another way, the term "faulty" in reference to an antenna element simply means that the antenna element is associated with a fault at any point along the communication path for a signal transmitted by or received at the antenna element.

The combination of the primary transmit signal and the primary receive signal are used by the RFID reader 30 to communicate with an interrogated RFID tag pursuant to some predetermined protocol. Commonly, such communication can include reading the payload of the RFID tag and/or transmitting information to the RFID tag for recordation thereon. In some embodiments, the primary transmit beam has a beamwidth of less than or equal to 120°. As used herein, the term "beamwidth" may be defined as the angle between the half-power (−3 dB) points of the main lobe of the beam, when referenced to the peak effective radiated power of the main lobe of the beam. The beamwidth of the primary transmit beam being less than or equal to 120° can be measured across the azimuth plane, across the elevation plane, or a combination of the azimuth plane and the elevation plane. It should be understood that the angular values noted above are expressed in absolute terms and are not affected by the 0° reference direction along the azimuth plane and/or the 0° reference direction along the elevation plane. In other words, when measuring along the azimuth plane, a beam directed at a 0° azimuth bearing may have a beamwidth of 120° when the half-power points of the main lobe of the beam are at 60° and 300°. Similarly, a beam directed at a 90° azimuth bearing may have a beamwidth of 120° when the half-power points of the main lobe of the beam are at 30° and 150°. Along similar lines, when considering a beamwidth of a beam along an elevation plane, the angle that defines the beamwidth should be viewed in absolute terms irrespective of the 0° elevation direction. As such, when measuring along the elevation plane, a beam directed at a 0° elevation bearing may have a beamwidth of 120° when the half-power points of the main lobe of the beam are at 60° elevation, X° azimuth and 60° elevation, X+180° azimuth. Similarly, when measuring along the elevation plane, a beam directed at a 20° elevation, X° azimuth bearing may have a beamwidth of 60° when the half-power points of the main lobe of the beam are at 50° elevation, X° azimuth and 10° elevation, X+180° azimuth. In some embodiments, the gain of the primary transmit beam is greater than or equal to 6 dB. In some embodiments, a primary transmit beam may have a beamwidth of greater than or equal to 25°. Conforming the primary transmit beam to the aforementioned characteristics may be particularly beneficial to avoid creating excessive interference with other electronic components (e.g., other RFID reader 30 at the venue 100) that may be present within the vicinity of the RFID reader 30 while still retaining sufficient coverage.

Referring again to FIG. 4B, the RFID reader 30 may generate one or more secondary receive beams in addition to the primary receive beam. As shown in FIG. 4B, the return signals from each interrogated tag from the antenna elements 26 are conducted through respective RF transceivers 24, to a splitter 25 and then routed to four sub-circuits to simultaneously generate four different secondary receive signals, each being sampled from a predetermined direction, as described below. Thus, the return signals are conducted from the splitter 25 to apply a set of weights {W5, W6, W7, W8} before being summed by adder 32 to generate a secondary receive signal (B), to apply a set of weights {W9, W10, W11 W12} before being summed in adder 34 to generate a secondary receive signal (C), to apply a set of weights {W13, W14, W15, W16} before being summed in adder 36 to generate a secondary receive signal (D), and to apply a set of weights {W17, W18, W19, W20} before being summed in adder 38 to generate a secondary receive signal (E). Put another way, the return signal from antenna element 1 is conducted through transceiver Tx/Rx 1 to different channels via which weights W1, W5, W9, W13 and W17 are applied; the return signal from antenna element 2 is conducted through transceiver Tx/Rx 2 to different channels via which weights W2, W6, W10, W14 and W18 are applied; the return signal from antenna element 3 is conducted through transceiver Tx/Rx 3 to different channels via which weights W3, W7, W11, W15 and W19 are applied; and the return signal from antenna element 4 is conducted through transceiver Tx/Rx 4 to different channels via which weights W4, W8, W12, W16 and W20 are applied. The determined signal strengths from each of the primary receive signal and any secondary receive signals may then be used by, for example, the bearing processing module 22, to estimate the bearing and/or position of the responding RFID tag relative to the RFID reader 30. It is to be understood that this approach should not be viewed as being limited to four secondary receive signals and can be extended any number of secondary receive signals with the appropriate hardware and/or software and the appropriate weights.

When there is fault associated with one of the antenna elements, the component of the primary receive signal and/or any secondary receive signal generated based on the return signal sensed by the that antenna element may be missing and/or indicate the incorrect signal strength. As a result, the bearing and/or position determined the bearing processing module 22 is inaccurate. Accordingly, the techniques disclosed herein relate to improving the accuracy of the bearing and/or position determined from the primary receive signal and/or any secondary receive signal when there is a faulty antenna element.

Returning to FIG. 2, in some embodiments, the weights database 11 of the memory 21 is configured to store a plurality of weight sets corresponding to a plurality of orientations in azimuth and elevation with respect to the RIFD reader 30. For example, each location in the polar diagram illustrated in FIG. 5 may correspond to one or more weight sets. To this end, in the example shown in FIG. 4B, the set of weights {W1, W2, W3, W4} corresponds to a first azimuth/elevation angle, the set of weights {W5, W6, W7, W8} corresponds to a second azimuth/elevation angle, and so on. It should be appreciated that most scan cycles do not sweep the full resolution of control of the antenna elements 26. Accordingly, the weights database 11 may only store the subset of weight sets that correspond to the particular scan cycle programmed into the tag processing module 18. It should be appreciated that a particular azimuth/elevation angle may be associated with two or more sets of weights. To this end, the particular azimuth/elevation angle may be associated with a different weight set for each polarization type for a beam emitted at the particular azimuth/elevation angle. In addition to the weight sets, the memory 21 and/or the weights database 11 may be configured to store the position of each antenna element 26 on the antenna 27. In some embodiments, the memory 21 and/or the weights database 11 stores the position of the antenna elements 26 with respect to the polar coordinate system depicted in FIG. 5. It should be appreciated that the calculations by which a set of weights based on a particular azimuth/elevation angle and the relative position of the antenna elements 26 is known to those skilled in the art.

In an embodiment, the fault correction module 23 is configured to detect a fault corresponding to one or more of the antenna elements 26. One example type of fault is when the channel between the controller 16 and the RFID transceivers 24 and/or the channel between the RFID transceivers 24 and the antenna elements 26 becomes impaired or otherwise prevents proper control of the antenna elements 26 and/or the signals transmitted or received thereat. This may occur when a power amplifier on the transmit path fails. Another type of fault occurs when the antenna element becomes physically disconnected from the RFID reader 30 or when the antenna element is bent, damaged, or otherwise has its shaped changed to alter the expected radiation pattern emitted by the antenna element. Accordingly, to detect the fault, the RFID reader 30 may be configured to detect, for example, a failure to receive an acknowledgement from a component, a signal loss above a threshold amount along a channel, and/or receive an indication from a sensor configured to monitor a physical connection of the antenna and/or the antenna elements thereof. If a component of the RFID reader 30 other than the fault correction module 23 is configured to detect one or more fault types, the output of that component may be routed to the fault correction module 23 to take the appropriate corrective action.

To account for the faulty antenna element, the fault correction module 23 may be configured to first identify which antenna element 26 is faulty. For example, as shown in FIG. 3, the antenna elements 26 may be assigned an antenna element number or other identifier uniquely corresponding to each antenna element 26. Accordingly, when the RFID reader 30 detects that a particular antenna element 26 is faulty, the indication provided to the fault correction module 23 may include the identifier of the faulty antenna element. In response, the fault correction module 23 ensures that beams emitted by the RFID reader 30 account for the particular antenna element that is faulty.

In some embodiments, the fault correction module 23 is configured to provide an indication to the tag processing module 18 when the fault correction module 23 detects the fault. In response to the indication, the tag processing module 18 is configured to obtain and apply an alternate set of weights to the transmit/receive signal carried over each channel between the controller 16 and the corresponding antenna element 26. In other embodiments, the fault correction module 23 is positioned logically between the tag processing module 18 and the RF transceivers 24. In these embodiments, the fault correction module 23 may be configured to receive an azimuth/elevation angle (and, in some embodiments, polarization) input to obtain and apply the corresponding set of weights to the transmit/receive signal as described with respect to FIGS. 4A-4B. When the fault correction module 23 detects the fault, the fault correction module 23 obtains and applies an alternate set of weights to the transmit/receive signal carried over each channel. It should be appreciated that while the following describes the fault correction module 23 obtaining and applying the alternate set of weights, it is envisioned that the following techniques may also be applied by the tag processing module 18 in response to receiving the indication from the fault correction module 23. Furthermore, in some embodiments, the tag processing module 18 and the fault correction module 23 may be combined into a single module configured to perform the functionality of both modules described herein.

In some embodiments, the fault correction module 23 queries the weights database 11 to obtain the alternate set of weights. In these embodiments, for each set of weights stored in the weights database 11, the weights database 11 may store N alternate weight sets to account for each of the N antenna elements 26 experiencing a fault. To this end, the alternate set of weights is designed to produce a beam in substantially the same direction as the indicated azimuth/elevation (and, in some embodiments, having the same polarization) using the N−1 non-faulty antenna elements. It should be appreciated that the alternate weight set may be configured to apply a weight of zero or another value that nullifies the transmit/receive signal carried on the channel corresponding to the faulty antenna. For example, if the fault correction module 23 detects a fault in antenna element 26-3, the fault correction module 23 may obtain from the weights database 11 the alternate set of weights where the weight corresponding to antenna element 26-3 is zero and the weights corresponding to the other N−1 antenna elements 26 are non-zero.

Additionally, or alternatively, the fault correction module 23 may be configured to dynamically determine the alternate set of weights based upon the position of the faulty antenna element and the indicated azimuth/elevation (and, in some embodiments, polarization). It should be appreciated that the set of weights dynamically determined by the fault detection module 23 generally produces the same set of weights that is stored in the weights database 11 in the alternate embodiment. To this end, in embodiments having a large number of antenna elements N, the storage requirements of N+1 sets of weights for each azimuth/elevation angle (and, in some embodiments, polarization) may exceed the storage capacity of the memory 21. Accordingly, dynamically determining the alternative set of weights alleviates the storage requirements of the weights database 11. On the other hand, querying the weights database 11 is typically a faster operation than dynamically generating the alternate set of weights. Accordingly, storing the alternate set of weights in the weights database 11 enables the RFID reader 30 to more quickly respond to a fault.

It should be appreciated that, in some embodiments, the RFID reader 30 implements a hybrid approach. In these embodiments, the alternate weight sets for the elevation/azimuth angles (and, in some embodiments, polarizations) that form the most commonly implemented scan pattern(s) for the RFID reader 30 are stored in the weights database 11, whereas the fault correction module 23 may dynamically determine the alternate weight sets for the elevation/azimuth angles (and, in some embodiments, polarizations) that are not included in the primary scan pattern(s).

It should be appreciated that while N can generally be any integer greater than 1, there are practical limitations on current implementations based upon current technology. To this end, if N is above 16, the processing power and/or storage requirements associated with generating and/or storing the alternate set of weights may cause the RFID reader 30 to be unable to produce an alternate beam within the time constraints associated with a scan cycle. On the other hand, if N is below 4 and one of the antenna elements is faulty, there may be too few non-faulty antenna elements to effectively steer a beam at the desired azimuth/elevation angle using the remaining antenna elements. It should be appreciated that as antenna element, storage, and/or processing technology advances, the disclosed techniques may still be applied to this new technology that overcomes these current challenges.

As it is used herein, the term "substantially the same direction" should be understood to be dependent on the number of antenna elements N. If N is a larger number (e.g., above 10), the RFID reader 30 may be able to generate a beam using an alternate set of weights that is directed within 2° of the beam generated using the standard set of weights for a particular azimuth/elevation angle (and, in some embodiments, polarization). On the other hand, if N is a smaller number (e.g., less than 6), the RFID reader 30 may only be able to generate a beam using an alternate set of weights that is directed within 10° of the beam generated using the standard set of weights for a particular azimuth/elevation angle (and, in some embodiments, polarization).

In some embodiments, the fault correction module 23 is configured to detect and correct for two antenna elements 26 being faulty. Similar to when there is one faulty antenna element 26, the weights database 11 may be configured to store an alternate set of weights corresponding to each combination of faulty antenna elements for each azimuth/elevation angle (and, in some embodiments, polarization). It will be appreciated that this requires storing N*(N−1) alternate sets of weights for each azimuth/elevation angle (and, in some embodiments, polarization). Accordingly, even in embodiments where the weights database 11 is configured to store an alternate set of weights corresponding to each of the N antenna elements being faulty, the fault correction module 23 may be configured to dynamically determine the alternate set of weights based upon the position of the two faulty antenna elements and the particular azimuth/elevation angle (and, in some embodiments, polarization) for the beam.

In alternate embodiments, to simplify process of correcting for two faulty antenna elements, the fault correction module 23 may instead be configured to apply the correction techniques when only one antenna element is faulty. To this end, the fault correction module 23 may apply the alternate set of weights corresponding to the faulty antenna element that has a greater impact on the beam produced by the phased antenna array when steered at the azimuth/elevation angle (and having, in some embodiments, a particular polarization). In particular, the fault correction module 23 may analyze the normal, non-alternative set of weights for the particular azimuth/elevation angle (and, in some embodiments, polarization) stored in the weights database 11 to identify the antenna element that is associated with a weight having a larger amplitude. Accordingly, the fault correction module 23 may then apply the above-described techniques for obtaining an alternate set based on this antenna element being faulty. In some embodiments, the fault correction module 23 may then set the weight corresponding to the other faulty antenna to zero or another value that nullifies the transmit/receive signal carried on the channel corresponding to the other faulty antenna.

It should be appreciated that when there are two faulty antenna elements, the ability for the RFID reader 30 to produce a beam in "substantially the same direction" is further impaired. The amount of this impairment may again depend on the number antenna elements N. If N is a large number (e.g., above 10), the RFID reader 30 may be able to generate a beam using an alternate set of weights that is directed within 10° of the beam generated using the standard set of weights for a particular azimuth/elevation angle (and, in some embodiments, polarization). On the other hand, If N is a small number (e.g., less than 6), the RFID reader 30 may be able to generate a beam using an alternate set of weights that is directed within 30° of the beam generated using the standard set of weights for a particular azimuth/elevation angle (and, in some embodiments, polarization).

Figure 6:
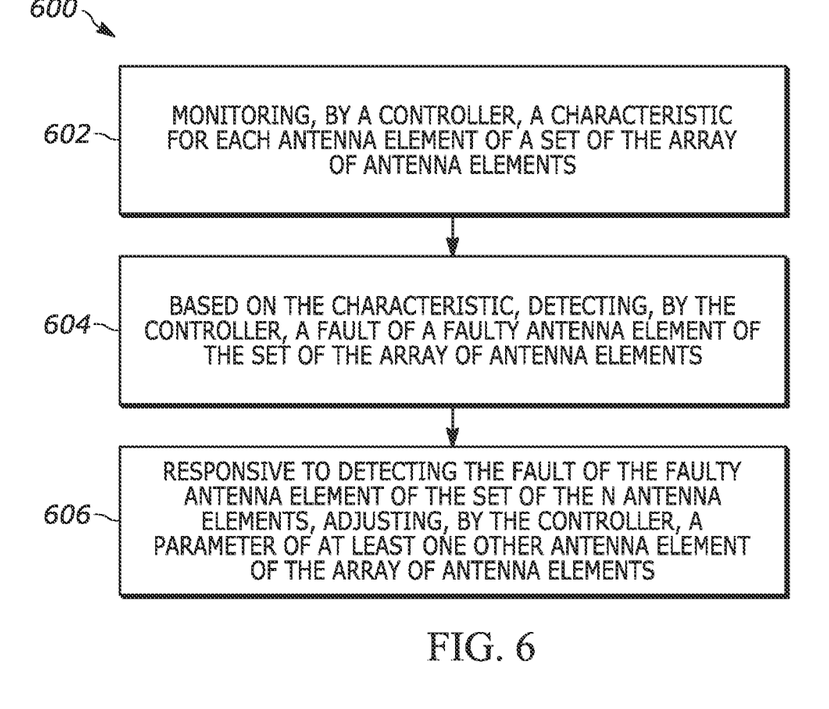
FIG. 6 is a flow diagram of an example method for maintaining directionality of an RFID signal in response to a fault associated with an antenna element of the RFID reader of FIG. 1.

Turning now to FIG. 6, illustrated is a flow diagram of an example method 600 for maintaining directionality of an RFID signal in response to a fault associated with an array of antenna elements included in an RFID reader. The RFID reader may include an array of antenna elements (such as the antenna elements 26) configured to interrogate RFID tags and a controller (such as the controller 16). As described above, the controller may include one or more modules (such as the tag processing module 18 and/or the fault correction module 23) configured to cause the controller to perform the functions associated with the method 600. In some embodiments, the array of antenna elements includes N antenna elements, wherein N is an integer between 4 and 16, inclusive.

The method 600 begins at block 602 when the controller monitors a characteristic for each antenna element of a set of the array of antenna elements. In some embodiments, the characteristic is connectivity to the antenna element. As one example manner of monitoring a connectivity characteristic, the controller may be adapted to receive connection status indications from a sensor configured to monitor a physical connection of the antenna elements. As another example, the controller may be configured to receive an indication of channel quality (e.g., a signal to noise ratio, a carrier to noise ratio, a transmit or receive power measurement, etc.) from a component configured to monitor the quality of communications carried of the communication channel. It should be appreciated that in some embodiments, the controller is only configured to monitor characteristics for only a set of all of the antenna elements included in the array of antenna elements. For example, if the RFID reader includes the example antenna 27 of FIG. 3, the controller may only be configure to monitor the odd antenna elements (i.e., antenna elements 26-1, 26-3, 26-5, 26-7, 26-9, 26-11, and 26-13).

At block 604, based on the characteristic, the controller is configured to detect a fault of a faulty antenna element of the set of the array of antenna elements. For example, the controller may determine that the faulty antenna element is faulty when the controller receives a connection status indication from a sensor indicating that the faulty element includes a fault in a physical connection. As another example, the controller may detect that the faulty antenna element is faulty when the channel quality characteristic for the communication channel corresponding to the faulty antenna element is below a threshold quality. As yet another example, the controller may detect that the faulty antenna element is faulty by failing to receive an acknowledgement message in response to a control signal related to control of the faulty antenna element and/or the signals transmitted/received thereat.

At block 606, responsive to detecting the fault of the faulty antenna element of the set of the N antenna elements, the controller is configured to adjust a parameter of at least one other antenna element of the array of antenna elements, wherein the parameter is a weight applied to a signal that is transmitted to or received at an antenna element. For example, during normal operation, the controller may be configured to receive instructions to generate a first beam in a predetermined direction relative to the RFID reader. For example, the instructions may be received as part of executing a scan cycle programmed into the controller and/or by programming the scan cycle into the controller. Accordingly, when the controller adjusts the parameter of the at least one other antenna element in response to detecting that the faulty antenna is faulty, the RFID reader generates an adjusted beam such that the adjusted beam maintains substantially similar directionality as the first beam.

In some embodiments, the RFID reader includes a weights database (such as the weights database 11) configured to store, for a plurality of predetermined directions relative to the RFID reader, a set of weights respectively configured to cause the array of antenna elements to generate a beam in the corresponding predetermined direction (and, in some embodiments, having a predetermined polarization). Accordingly, responsive to receiving instructions to generate the first beam, the controller may be configured to obtain, from the weights database, a set of weights to apply to respective antenna elements of the array of antenna elements. The set of obtained weights corresponds to the predetermined direction (and, in some embodiments, polarization) corresponding to the instruction to generate the first beam. As described above, for each database entry corresponding to a predetermined direction (and, in some embodiments, polarization), the weights database also stores alternate sets of weights to be used when an antenna element of the array of antenna elements is faulty. The alternate set of weights used when a particular antenna element is faulty is a set of weights for the other antenna elements of the array of antenna elements (e.g., the weight in the alternate set of weights for the particular antenna element is zero). Accordingly, the controller may obtain the alternate set of weights that produces the adjusted beam by obtaining, from the weights database, the alternate set of weights corresponding to the predetermined direction and the at least one other antenna element of the array of antenna elements. In some alternate embodiments, the controller obtains the alternate set of weights by calculating the alternate set of weights based upon a location of the faulty antenna element relative to the other antenna elements and the predetermined direction relative to the RFID reader.

In some additional embodiments, the controller is configured to detect a fault of a first antenna element and a second antenna element of the set of the array of antenna elements based on their respective characteristics. In these embodiments, the controller may be configured to obtain the alternate set of weights that produces the adjusted beam by obtaining, from the weights database, the alternate set of weights corresponding to the predetermined direction and the antenna elements of the array of antenna elements other than the first and second antenna elements. In other embodiments, the controller may obtain the alternate set of weights by calculating the alternate set of weights based upon a location of the first and second antenna elements relative to the other antenna elements and the predetermined direction relative to the RFID reader. Alternatively, the controller is configured to correct for two faulty antenna elements by applying the corrective actions corresponding to the antenna element that has a greater impact in determining the directionality of the first beam. Accordingly, the controller may be configured to (1) obtain, from the weights database, the set of weights corresponding the predetermined direction; (2) determine that a magnitude of a first weight of the set of weights corresponding to the first antenna element is greater than a magnitude of a second weight of the set of weights corresponding to the second antenna element; and (3)

obtain, from the weights database, the alternate set of weights corresponding to the predetermined direction and the antenna elements other than the first antenna element of the N antenna elements.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application-specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed:

1. A radio frequency identification (RFID) reader comprising:
   a phased array antenna having N antenna elements;
   a controller operatively connected to the phased array antenna, wherein the controller is configured to:
   monitor a characteristic for each antenna element of a set of the N antenna elements;
   based on the characteristic, detect a fault of a faulty antenna element of the set of the N antenna elements;
   responsive to detecting the fault of the faulty antenna element of the set of the N antenna elements, adjust a parameter of at least one other antenna element of the N antenna elements, wherein the parameter is a weight applied to a signal that is transmitted to or received at an antenna element;
   generate an adjusted beam to compensate for an azimuth angle and elevation angle associated with the faulty antenna element; and
   execute an RFID scan cycle using the adjusted beam to interrogate RFID tags.

2. The RFID reader of claim 1, wherein:
   the controller is configured to receive instructions to generate a first beam, via the phased array antenna, in a predetermined direction relative to the RFID reader; and
   wherein adjusting the parameter of the at least one other antenna element generates, via the phased array antenna, the adjusted beam such that the adjusted beam maintains substantially similar directionality as the first beam.

3. The RFID reader of claim 2, further comprising:
   a weights database configured to store, for a plurality of predetermined directions relative to the RFID reader, a set of weights respectively configured to cause the phased array antenna to generate a beam in the corresponding predetermined direction; wherein:
   responsive to receiving instructions to generate the first beam, the controller is configured to obtain, from the weights database, a set of weights to apply to respective antenna elements of the N antenna elements, and
   to generate the adjusted beam responsive to detecting the fault, the controller is configured to obtain an alternate set of weights corresponding to the at least one other antenna element of the N antenna elements.

4. The RFID reader of claim 3, wherein to obtain the alternate set of weights, the controller is configured to:
   obtain, from the weights database, the alternate set of weights corresponding to the predetermined direction and the at least one other antenna element of the N antenna elements.

5. The RFID reader of claim 3, wherein to obtain the alternate set of weights, the controller is configured to:
   calculate the alternate set of weights based upon a location of the faulty antenna element relative to the other antenna elements and the predetermined direction relative to the RFID reader.

6. The RFID reader of claim 3, wherein the controller is configured to:
   detect a fault of a first antenna element and a second antenna element of the set of the N antenna elements based on their respective characteristics.

7. The RFID reader of claim 6, wherein to adjust the parameter of at least one other antenna element of the N antenna elements, the controller is configured to:
   obtain, from the weights database, the set of weights corresponding the predetermined direction;
   determine that a magnitude of a first weight of the set of weights corresponding to the first antenna element is greater than a magnitude of a second weight of the set of weights corresponding to the second antenna element; and
   obtain, from the weights database, the alternate set of weights corresponding to the predetermined direction and the antenna elements other than the first antenna element of the N antenna elements.

8. The RFID reader of claim 6, wherein to adjust the parameter of at least one other antenna element of the N antenna elements, the controller is configured to:
   calculate the alternate set of weights based upon a location of the first and second antenna elements relative to the other antenna elements and the predetermined direction relative to the RFID reader.

9. The RFID reader of claim 1, wherein:
   the characteristic is connectivity to the respective antenna element; and
   to detect the fault in the faulty antenna element, the controller is configured to receive an indication that a communication channel to the faulty antenna element includes a fault.

10. The RFID reader of claim 1, wherein N is an integer between 4 and 16, inclusive.

11. A method for maintaining directionality of a radio frequency identification (RFID) signal in response to a fault detected at an array of antenna elements, the method comprising:
    monitoring, by a controller, a characteristic for each antenna element of a set of the array of antenna elements;
    based on the characteristic, detecting, by the controller, a fault of a faulty antenna element of the set of the array of antenna elements; and
    responsive to detecting the fault of the faulty antenna element of the set of the N antenna elements, adjusting, by the controller, a parameter of at least one other antenna element of the array of antenna elements, wherein the parameter is a weight applied to a signal that is transmitted to or received at an antenna element; and
    generating an adjusted beam to compensate for an azimuth angle and elevation angle associated with the faulty antenna element; and
    executing an RFID scan cycle using the adjusted beam.

12. The method of claim 11, further comprising:
receiving, at the controller, instructions to generate a first beam, via the array of antenna elements, in a predetermined direction relative to the RFID reader; and
wherein adjusting the parameter of the at least one other antenna element comprises generating, via the array of antenna elements, the adjusted beam such that the adjusted beam maintains substantially similar directionality as the first beam.

13. The method of claim 12, further comprising:
responsive to receiving instructions to generate the first beam, obtaining, from a weights database, a set of weights to apply to respective antenna elements of the array of antenna elements, wherein the weights database is configured to store, for a plurality of predetermined directions relative to the RFID reader, a set of weights respectively configured to cause the array of antenna elements to generate a beam in the corresponding predetermined direction;
wherein generating the adjusted beam responsive to detecting the fault comprises obtaining, via the controller, an alternate set of weights corresponding to the at least one other antenna element of the array of antenna elements.

14. The method of claim 13, wherein obtaining the alternate set of weights comprises:
obtaining, from the weights database, the alternate set of weights corresponding to the predetermined direction and the at least one other antenna element of the array of antenna elements.

15. The method of claim 13, wherein obtaining the alternate set of weights comprises:
calculating, by the controller, the alternate set of weights based upon a location of the faulty antenna element relative to the other antenna elements and the predetermined direction relative to the RFID reader.

16. The method of claim 13, further comprising:
detecting, by the controller, a fault of a first antenna element and a second antenna element of the set of the array of antenna elements based on their respective characteristics.

17. The method of claim 16, wherein adjusting the parameter of at least one other antenna element of the array of antenna elements comprises:
obtaining, from the weights database, the set of weights corresponding the predetermined direction;
determining, by the controller, that a magnitude of a first weight of the set of weights corresponding to the first antenna element is greater than a magnitude of a second weight of the set of weights corresponding to the second antenna element; and
obtaining, from the weights database, the alternate set of weights corresponding to the predetermined direction and the antenna elements other than the first antenna element of the N antenna elements.

18. The method of claim 16, wherein adjusting the parameter of at least one other antenna element of the array of antenna elements, the controller is configured to:
calculating, by the controller, the alternate set of weights based upon a location of the first and second antenna elements relative to the other antenna elements and the predetermined direction relative to the RFID reader.

19. The method of claim 11, wherein:
the characteristic is connectivity to the respective antenna element; and
detecting the fault in the faulty antenna element comprises receiving, at the controller, an indication that a communication channel to the faulty antenna element includes a fault.

20. The method of claim 11, wherein the array of antenna elements includes N antenna elements, wherein N is an integer between 4 and 16, inclusive.

* * * * *